US006496912B1

(12) United States Patent
Fields, Jr. et al.

(10) Patent No.: US 6,496,912 B1
(45) Date of Patent: Dec. 17, 2002

(54) SYSTEM, METHOD, AND SOFTWARE FOR MEMORY MANAGEMENT WITH INTELLIGENT TRIMMING OF PAGES OF WORKING SETS

(75) Inventors: Mahlon David Fields, Jr., Redmond, WA (US); Stuart Sechrest, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/276,271

(22) Filed: Mar. 25, 1999

(51) Int. Cl.$^7$ .............................................. G06F 12/00
(52) U.S. Cl. ..................... 711/170; 711/173; 711/159
(58) Field of Search ................................ 711/170, 173, 711/153, 159, 206, 207, 208, 209

(56) References Cited

U.S. PATENT DOCUMENTS

| | | | | |
|---|---|---|---|---|
| 4,035,778 A | * | 7/1977 | Ghanem ...................... 711/133 |
| 5,101,485 A | * | 3/1992 | Perazzoli, Jr. ............... 711/206 |
| 5,493,663 A | * | 2/1996 | Parikh ......................... 711/159 |
| 5,517,643 A | * | 5/1996 | Davy .......................... 709/105 |
| 5,664,191 A | * | 9/1997 | Davidson et al. ............ 709/100 |
| 5,721,917 A | * | 2/1998 | Elliot et al. .................. 707/702 |

OTHER PUBLICATIONS

Bach, M.J., "Memory Management Policies", *The Design of the Unix Operating System*, Prentice–Hall, Inc., Englewood Wood, New Jersey, 271–311, (1986).

Solomon, D.A., "Memory Management", *Inside Windows NT*, Second Edition, Microsoft Press, pp. 217–304, (1998).

Tsichritzis, D.C., et al., *Operating Systems*, Academic Press, New York, pp. 69–95, 96–119, (1974).

* cited by examiner

Primary Examiner—Glenn Gossage
(74) Attorney, Agent, or Firm—Leydig, Voit & Mayer, Ltd (57) ABSTRACT

A computer system, method and computer readable medium for memory management with intelligent trimming of pages of working sets are disclosed. The computer system has memory space allocatable in chunks, known as pages, to specific application programs or processes. The pages allocated to a specific application program or process define a working set of pages for the program or process. Occasionally, a system runs short of free memory space and needs to reduce the size of working sets using a process called trimming. A trimming method is disclosed that estimates numbers of trimmable pages for working sets based upon a measure of how much time has elapsed since the memory pages were last accessed by the corresponding application program. This estimation is performed prior to the need to trim working sets, and the trimming method uses these estimates to facilitate faster and more accurate trimming and thus faster recovery from shortages of free memory.

24 Claims, 5 Drawing Sheets

| Page Number | | $C_1$ | $C_0$ | Cw | Gl | L | D | A | Cd | Wt | O | W | V |
|---|---|---|---|---|---|---|---|---|---|---|---|---|---|
| 31 | | 12 | 11 | 10 | 9 | 8 | 7 | 6 | 5 | 4 | 3 | 2 | 1 | 0 |

SYSTEM, METHOD, AND SOFTWARE FOR MEMORY MANAGEMENT WITH INTELLIGENT TRIMMING OF PAGES OF WORKING SETS

TECHNICAL FIELD

This invention concerns memory management systems for computer systems, particularly methods of trimming, or reducing, working sets.

BACKGROUND OF THE INVENTION

Personal computers allow users to do an almost unlimited number of tasks. Examples include drafting term papers and letters, organizing recipes and addresses, tracking checking accounts and stock portfolios, communicating via electronic mail with other computer users, and drawing blueprints for home improvements. To accomplish these and other tasks, the typical computer system includes application programs—specific sets of instructions—that work with other components of the computer system to provide specific functions. Application programs are often called software to distinguish from the physical equipment, or hardware, of a computer system.

The computer system typically includes a processor, a short-term memory, a long-term memory, a keyboard, a visual display, and an operating system. The operating system is a special kind of software that facilitates execution of application programs. Application programs logically combine functions or services of the operating system with those of the processor to achieve their more complex functions. Examples of typical operating-system functions include initial interpretation of inputs from the keyboard and managing memory for application programs.

One facet of memory management concerns the allocation of short-term memory during start up and execution of application programs. Starting an application program generally entails retrieving some instructions making up the program from a long-term memory, such as a magnetic or optical disk, and copying them into portions of a short-term memory, such as a random-access memory (RAM), before the processor begins executing the program instructions. Short-term memory devices are generally faster than long-term memory devices and allow the processor to more quickly fetch and execute individual program instructions. The short-term memory is organized typically as a set of memory pages, each having the same storage capacity, for example, 4096 bytes.

As each application program starts, a memory manager within the operating system allocates a set of short-term memory pages to each application program, with the objective of reducing the number of times the processor needs to access the slower, long-term memory during execution of the application program. The set of pages allocated, or assigned, to an application program is called its working set. As application programs execute, the memory manager detects page faults—conditions indicating that applications need certain data or program instructions initially left behind in long-term memory—and eventually expands corresponding working sets to include these data or instructions if there is sufficient short-term memory available. The amount of available short-term memory is called free memory. However, if there is insufficient free memory to allow expansion of working sets, the memory manager attempts to increase the amount of free memory by re-assigning memory pages from other working sets to free memory.

This process of re-assigning pages from working sets to free memory is known as trimming the working sets. Trimming in the Microsoft WINDOWS NT 4.0 brand operating system, for example, requires the memory manager to compare the current size of one working set to its minimum allowable size every six seconds during a free-memory shortage. When the memory manager finds a working set that is larger than its minimum allowable size and that has not had too many recent page faults, the manager trims a limited number of pages from its working set, adding the pages to free memory and thus making them available for the working sets of other application programs. If there is still a free memory shortage, the memory manager looks for the next working set that is larger than its minimum allowable sizes and trims pages from it. This process of sequentially checking for larger-than-necessary working sets repeats until the memory manager trims enough pages to end the memory shortage.

In trimming pages from a specific working set, the memory manager typically tries to trim pages that have not been accessed recently. It does this by checking the access bit for each page of a working set to see whether the page has been accessed (since the last time it was checked). If the access bit is zero, indicating that the page has not been accessed, the manager re-assigns the page to free memory. If the bit is one, indicating that the page has been accessed, the memory manager resets it to zero. (If the bit for this page is still zero the next time the manager checks the page, the memory manager will trim the page.) The memory manager then similarly checks the access bit for the next page of the working set, trimming the page if it has not been accessed or resetting the access bit to zero if it has. This page-by-page search for trimmable pages continues through the working set and onto the next working set until either enough pages have been trimmed to end the free-memory shortage or each working set has been checked. (For further details, see David A. Solomon, Inside Windows NT, Second Edition (ISBN 1-57231-677-2) pages 217–304 (1998).)

In devising the present invention, the inventors recognized that this trimming method suffers from at least two problems. First, because it lacks accurate information about the relative use of specific pages, it severely limits the rate pages can be trimmed from working sets and thus reduces how fast the operating system can respond to changing memory needs of application programs, ultimately forcing them to resort to slower, long-term memory more often than may be necessary. Second, because the method treats each working set that has trimmable pages equally and in sequence, it can sometimes incorrectly and disproportionately distribute the trimming burden across a few working sets, ignoring other working sets better suited for trimming, that is, working sets having larger numbers of pages that have not been accessed recently. Accordingly, there is a need for better ways of trimming working sets.

SUMMARY OF THE INVENTION

To address these and other needs, the inventors devised a memory management system, method, and software that facilitates faster, more intelligent trimming of working sets. Specifically, in one implementation, or embodiment, the method includes assigning working sets of memory pages to corresponding application programs; estimating numbers of memory pages eligible for trimming from the working sets; and trimming the working sets based on the estimated numbers of memory pages eligible for trimming.

In an exemplary implementation, the method entails tracking the age of the memory pages of each working set using a two-bit age counter that permits classifying the pages of each working set into four classes based on how recently they were last accessed. In this implementation, estimating the numbers of memory pages eligible for trimming includes summing the number of pages in the three oldest of the four classes. Additionally, trimming the working sets entails sorting at least some of the estimates based on magnitude and trimming working sets with larger estimates before trimming those with small ones.

DETAILED DESCRIPTION OF THE INVENTION

The following detailed description, which references and incorporates FIGS. 1–5, describes and illustrates one or more exemplary embodiments of the invention. These embodiments, offered not to limit but only to exemplify and teach the invention, are shown and described in sufficient detail to enable those skilled in the art to make and use the invention. Thus, where appropriate to avoid obscuring the invention, the description may omit certain information known to those of skill in the art.

Overview

The description is organized into three sections. The first section describes an exemplary computer system implementation of the invention. The second section describes operation of the exemplary computer system, specifically how it trims working sets. And, the third section summarizes some features and advantages of the exemplary embodiment.

Exemplary Computer System Embodying the Invention

Figure 1:
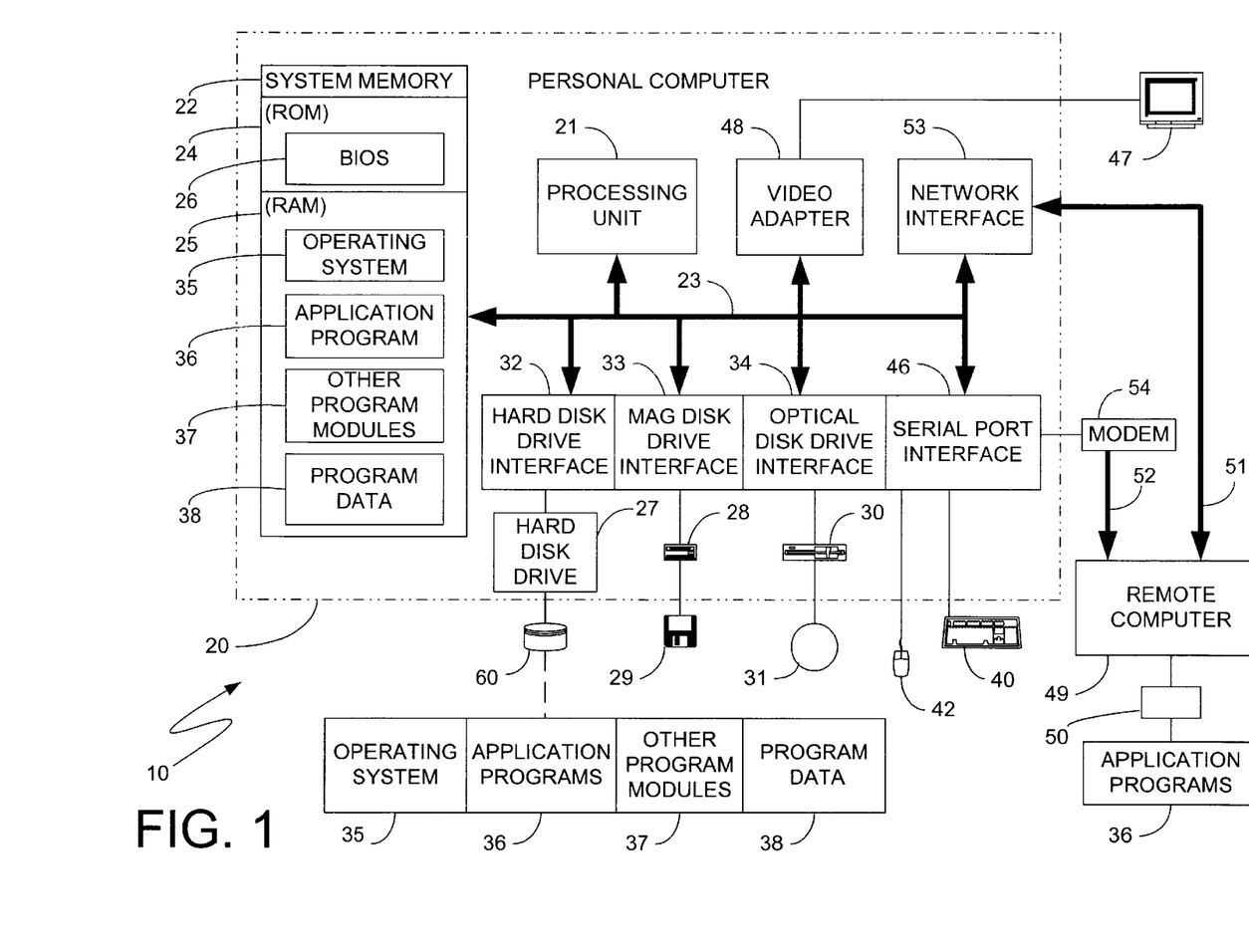
FIG. 1 is a block diagram of an exemplary computer system 10 embodying the invention.

FIG. 1 shows an exemplary computer system 10 which embodies the invention. The following description of system 10 briefly and generally describes an exemplary computer hardware and computing environment for implementing the invention. However, the invention can be practiced with other computer system configurations, including hand-held devices, multiprocessor systems, microprocessor-based or programmable consumer electronics, network personal computers ("PCs"), minicomputers, mainframe computers, and the like. The invention can also be practiced in distributed computing environments where tasks are performed by remote processing devices linked through a communications network. In a distributed computing environment, program modules can be located in both local and remote memory storage devices.

Moreover, though not required, the invention is described in the general context of computer-executable instructions, such as program modules, being executed by a computer, such as a personal computer. Generally, program modules include routines, programs, objects, components, data structures, and so forth, that perform particular tasks or implement particular abstract data types.

More particularly, computer system 10 comprises, or includes, a general purpose computing device in the form of a computer 20, which itself includes a processing unit 21, a system memory 22, and a system bus 23 that operatively couples various system components, including system memory 22, to process unit 21. Though the exemplary embodiment includes only one processing unit, other embodiments include more than one processing unit 21, such that the processor of computer 20 comprises a plurality of processing units, commonly referred to as a parallel-processing environment. Computer 20 can be a conventional computer, a distributed computer, or any other type of computer. Thus, the invention is not limited to a particular computer or type of computer.

System bus 23 can be any of several types of bus structures including a memory bus, a peripheral bus, and a local bus using any of a variety of bus architectures. The system memory, sometimes referred to as simply the memory, includes read-only memory (ROM) 24 and random access memory (RAM) 25. ROM 24 stores a basic-input-output system (BIOS) 26, containing the basic routines that help to transfer information between elements of computer 20.

Computer system 10 further includes a hard-disk drive 27 for reading and writing information on a hard disk (not shown), a magnetic disk drive 28 for reading from or writing to a removable magnetic disk 29, and an optical disk drive 30 for reading from or writing to a removable optical disk 31 such as a compact-disk read-only-memory (CD ROM) or other optical media. Hard-disk drive 27, magnetic disk drive 28, and optical disk drive 30 are connected respectively to system bus 23 by a hard-disk drive interface 32, a magnetic disk drive interface 33, and an optical disk drive interface 34. These drives and their associated computer-readable media provide nonvolatile storage of computer-readable instructions, data structures, program modules and other data for computer 20. However, any type of computer-readable media which can store data accessible by a computer, such as magnetic cassettes, flash memory cards, optical disks, Bernoulli cartridges, random-access memories (RAMs), read only memories (ROMs), and the like, can be used in the exemplary operating environment.

System 10 also includes a number of program modules stored on the hard disk, magnetic disk 29, optical disk 31, ROM 24, or RAM 25. These include an operating system 35, one or more application programs 36, other program modules 37, and program data 38. Operating system 35 provides numerous basic functions and services to application programs 36 stored by system memory 22, hard-disk drive 27, and/or hard-disk drive 50 of remote computer 49. For general details on the types of functions and services, refer to the Microsoft Windows98 Resource Kit (ISBN 1-57231-644-6) or Microsoft Windows at a Glance (ISBN 1-57231-631-4) which are incorporated herein by reference. The invention, however, is not limited to a particular operating-system type or architecture. Indeed, the invention can be incorporated in any current or future operating system, for example, the Microsoft WINDOWS 98 brand operating system, the Microsoft WINDOWS NT 4.0 brand operating system, the International Business Machines Corporation OS/2 brand operating system, and the Apple Computer MACINTOSH OS brand operating system.

Figure 2:
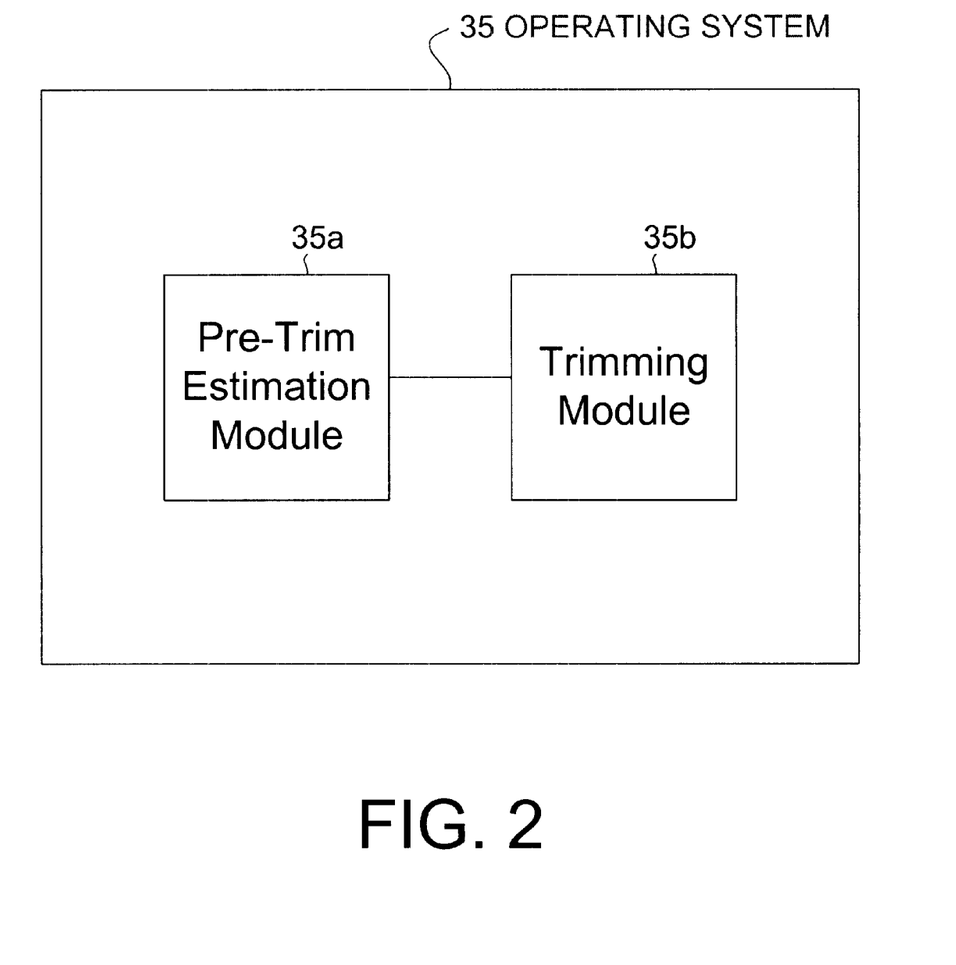
FIG. 2 is a partial block diagram of operating system 35 in computer system 10, showing a trim-page estimation module 35a and a trimming module 35b embodying the invention.

FIG. 2, a partial block diagram, shows that exemplary operating system 35 includes an estimation module 35a for estimating numbers of trimmable pages (trim pages) for one or more working sets and a trim module 35b for trimming pages based on the estimated numbers of trim pages. Although not explicitly shown in FIG. 2, the exemplary embodiment places modules 35a and 35b within the kernel of operating system 35. However, other embodiments place one or more of these modules in a separate privileged process. Furthermore, still other embodiments provide a separate application program that includes one or more of the modules. The functions and exemplary implementations of the modules are explained in detail below. The functions of the invention can be grouped and replicated in numerous other ways. Thus, the invention is not limited to any particular functional division or implementation mode.

FIG. 1 also shows that computer 20 accepts user input through input devices such as a keyboard 40 and pointing device 42. Other input devices (not shown) may include a microphone, joystick, game pad, satellite dish, scanner, or the like. These and other input devices are often connected to processing unit 21 through a serial port interface 46 that is coupled to the system bus, but may be connected by other interfaces, such as a parallel port, game port, or a universal serial bus (USB). A monitor 47 or other type of display device is also connected to system bus 23 via an interface, such as a video adapter 48. In addition to the monitor, computers typically include other peripheral output devices (not shown), such as speakers and printers.

Computer 20 can operate in a networked environment using logical connections to one or more remote computers, such as remote computer 49. In this exemplary embodiment, these logical connections include a communication device coupled to computer 20. However, the invention is not limited to a particular type of communications device. Remote computer 49, which can be another computer, a server, a router, a network personal computer (PC), a client, a peer device, or other common network node, typically includes many or all of the elements of computer 20. However, for clarity FIG. 1 only shows it including a memory storage device 50. The logical connections shown in FIG. 1 include a local-area network (LAN) 51 and a wide-area network (WAN) 52. Such networking environments are commonplace in offices, enterprise-wide computer networks, intranets and the Internet.

When used in a LAN-networking environment, computer 20 is connected to the local network 51 through a network interface or adapter 53, which is one type of communications device. When used in a WAN-networking environment, computer 20 typically includes a modem 54, which may be internal or external, or any other type of communications device for establishing communications over wide-area network 52, such as the Internet. Modem 54 is connected to system bus 23 via serial port interface 46. In a network environment, one or more of the program modules described above (or portions thereof) can be stored in the remote memory storage device. Furthermore, the illustrated network connections shown are only exemplary, and other communication means and devices for establishing a communications link between the computers may be used.

The exemplary computer can be a conventional computer, a distributed computer, or any other type of computer, since the invention is not limited to any particular computer. A distributed computer typically includes one or more processing units as its processor, and a computer-readable medium such as a memory. The computer can also include a communications device such as a network adapter or a modem, so that it is able to communicatively couple with other computers to form a computer network.

Operation of the Exemplary Computer System

The invention primarily concerns interactions among operating system 35, application programs 36, and RAM 24. Generally, operating system 35 responds to selection or invocation of one or more of application programs 36 by creating one or more corresponding processes and assigning corresponding working sets of memory pages from RAM 24. In the exemplary embodiment, each page has 4096 bytes; however, other embodiments of the invention use memory pages of smaller or larger or heterogeneous capacities. In the exemplary embodiment, once one or more working sets are assigned, age data for each page of each working set can be maintained, indicating how much time has elapsed since each page was last referenced. The age data is maintained as a two-bit count implemented in software using two extra bits in the page-table entry (PTE) for each memory page.

Figure 3:
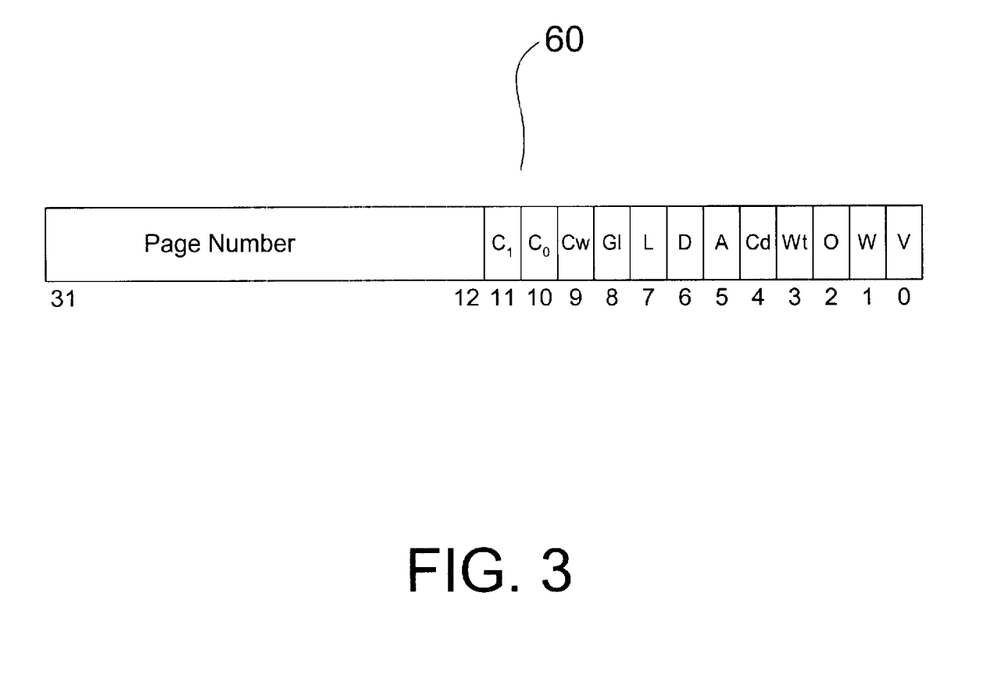
FIG. 3 is a diagram of an exemplary data structure for a page-table entry embodying the invention.

FIG. 3 illustrates an exemplary data structure 60 for one of these page-table entries. Data structure 60 includes 32 bits, most of which serve conventional purposes. In particular, bit 0, the valid bit, indicates whether the page maps to a page in RAM, as opposed to a backing store, such as the hard disk; bit 1, the write bit, indicates whether the page is read/write or read-only; bit 2, the owner bit, indicates whether user-mode code can access the page or whether the page is limited to kernel-mode access; bit 3, the write-through bit, enables or disables caching of writes, that is whether writes pass directly through to long-term storage or are held temporarily in short-term memory. Bit 4 indicates whether the page is cached or not. Bit 5, the accessed bit, indicates whether the page has been read; bit 6, the dirty bit, indicates whether the page has been written; bit 7 is reserved; bit 8, the global bit, indicates whether a translation process was applied to all processes using this page; and bit 9 is reserved. Bits 10 and 11, which are normally reserved, are used as the age counter. Bits 12–31 are used for working set page numbers. (Another embodiment combines reserved bit 9 with bits 10 and 11 to form a three-bit age counter that provides eight age states.) In practice, the exemplary embodiment combines a number of these structures, specifically one for each page of each working set, to form a novel page table structure.

Bits 10 and 11 in the exemplary page-table entry operable as a saturating two-bit counter, providing four sequential age states, with each successive state presenting a longer period of time since the associated page was last referenced. Moreover, the association of one of four age states with each page of a working set allows one to define four corresponding age bins for each working set and thus to keep track of how many pages of each working set fall into each age bin. These age counts and age bins are used within the exemplary method as illustrated in FIGS. 4 and 5.

Figure 4:
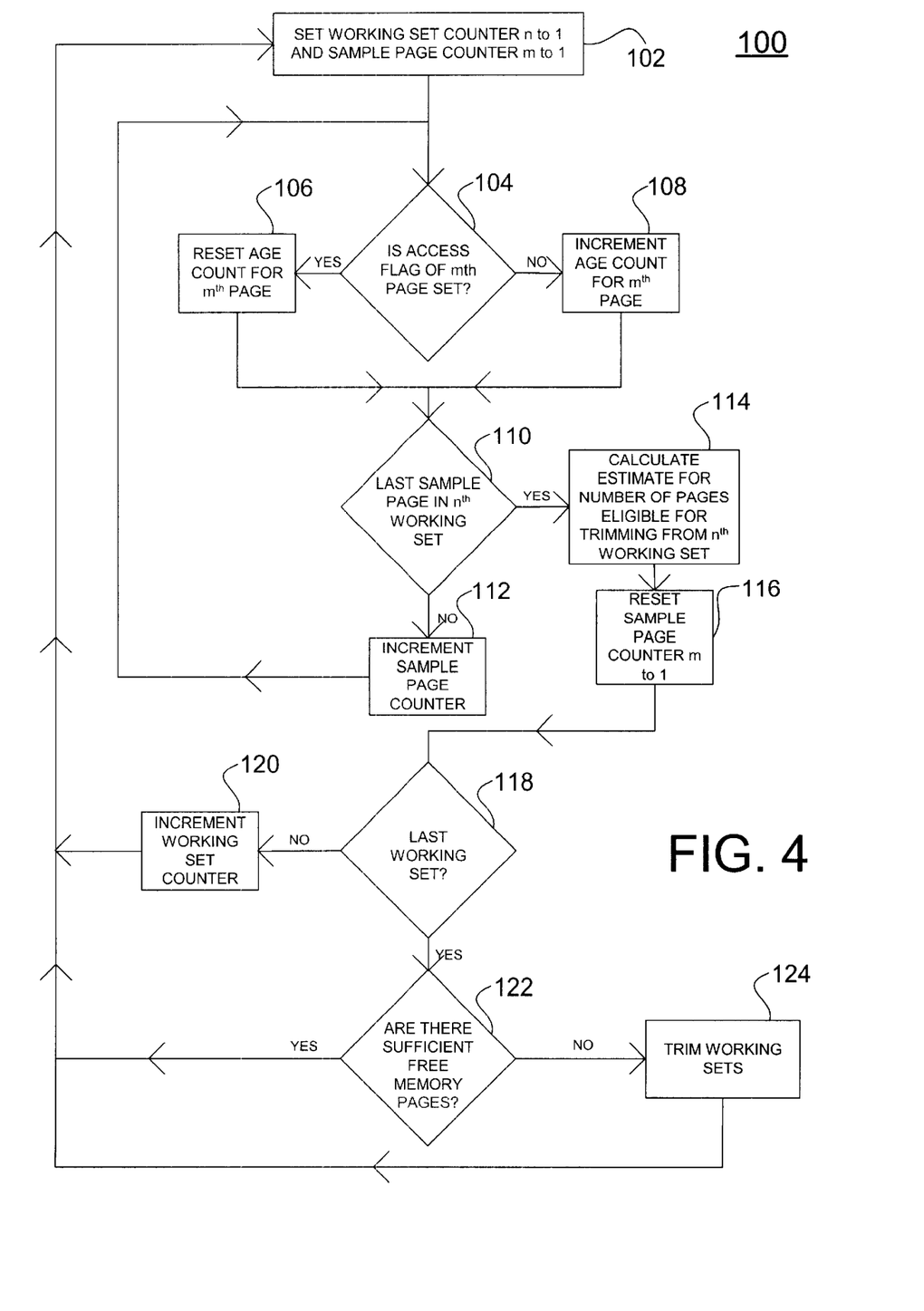
FIG. 4 is a flowchart illustrating an exemplary method including estimating and trimming modules according to the present invention.
Figure 5:
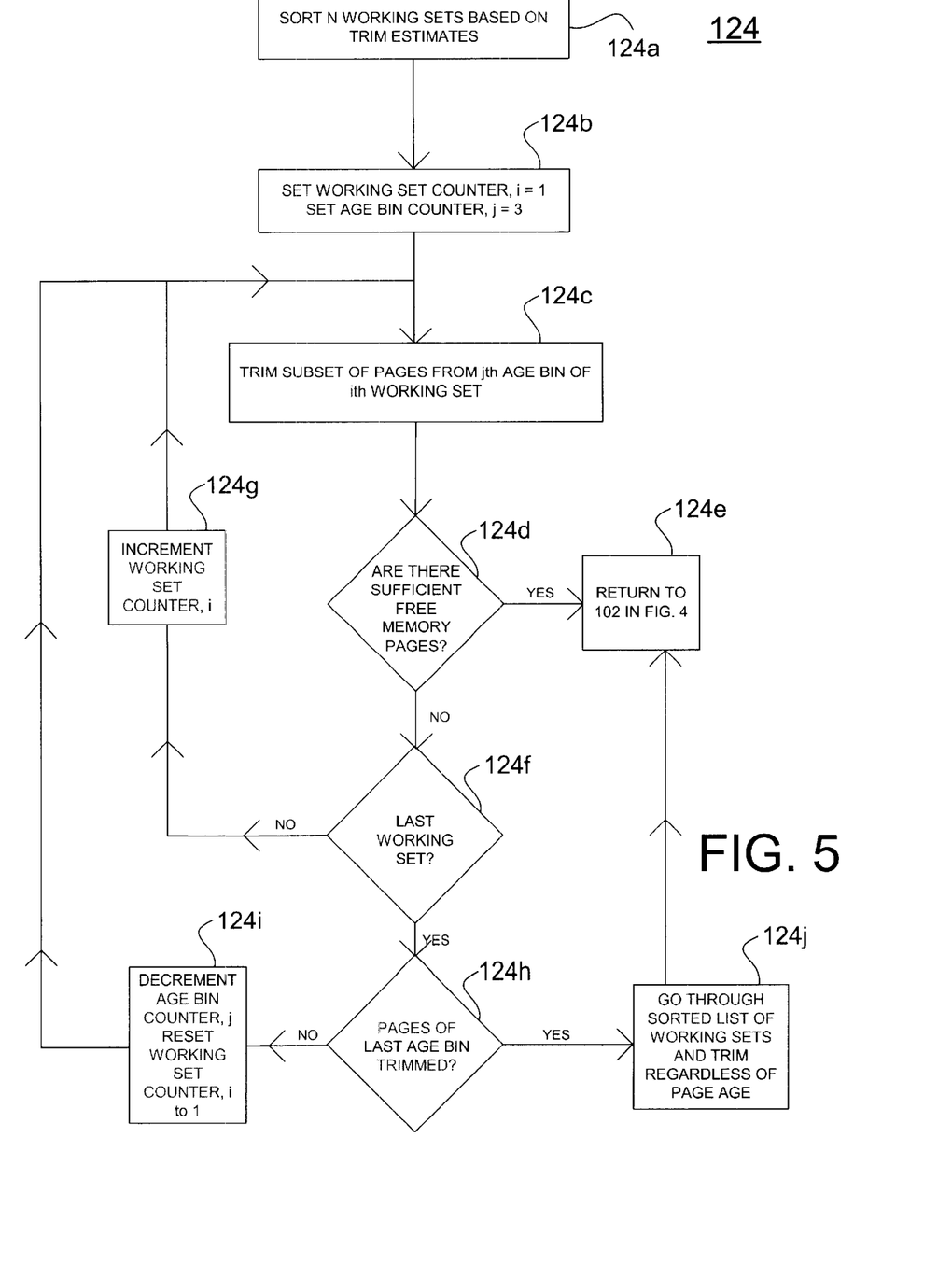
FIG. 5 is a flowchart showing further details of the trimming module in the exemplary method of FIG. 4.

More particularly, FIG. 4 shows an exemplary method 100 of operating computer system 10, which includes process blocks 102–124 that are generally executed in parallel with other activity of processing unit 21 (shown in FIG 1.) Blocks 102–122 represent an exemplary embodiment of estimation module 35a, and block 124 represents an exemplary embodiment of trimming module 35b.

In block 102, processing unit 21 sets working set counter n, which runs from one to N, to one and sample page counter m, which ranges from one to M, to one. N represents the number of application programs, processes, or tasks having assigned working sets, and M represents the number of pages for the n-th working set. After setting the working set counter and sample page counter, execution proceeds to decision block 104.

In block 104, processing unit 21 examines the access flag for the m-th page of the n-th working set. In the exemplary embodiment, the access flag is implemented in hardware for the physical memory page; however, in other embodiments this flag is implemented in software. If the access flag is set, indicating that the m-th memory page has been accessed for a read or write operation, execution branches to block 106, where processing unit 21 resets the age counter for the m-th memory page. However, if the access flag is not set, indicating that the m-th memory page has not been accessed, execution branches to block 108, and the age counter for the m-th memory page is incremented. Execution then continues to decision block 110.

In decision block 110, processing unit 21 determines whether the last page to be sampled in the working set has been considered. If the last sample page has not been considered, processing unit 21 increments the sample page counter based on a preselected increment that determines how many pages of each working set are considered in estimating a number of trimmable pages for the working set. The exemplary embodiment samples one-eighth, one-sixteenth, one-thirty-second, one-sixty-fourth, or one-one-hundred-twenty-eighth of the pages for each working set. The sampling can be either random or uniform. For uniform sampling, every eighth, sixteenth, thirty-secondth, sixty-fourth, or one-twenty-eighth page of a working set is considered. One can also sample every page of every working set; however, this places a considerably greater burden on processing unit 21 and may adversely affect processor performance from a user perspective. After incrementation of the sample page counter, execution returns to decision block 104 to check the access flag for the next sample page of the n-th working set.

On the other hand, if decision block 110 determines that the last sample page has been checked, execution of the exemplary method proceeds to process block 114. In block 114, processing unit 21 calculates an estimate for the number of pages that are eligible for trimming from the n-th working set. In the exemplary embodiment, the method includes using the following formula to estimate the number of eligible pages, or trim pages:

$$\text{TrimPageEstimate}[n,t] = \min\{(\text{MaxTrimIncr} + \text{TrimPageEstimate}[n,t-1]),$$

$$(\text{NumPagesWithAgeCount}[n,1] + \text{NumPagesWithAgeCount}[n,2] + \text{NumPagesWithAgeCount}[n,3])\},$$

where n denotes the n-th working set, t denotes the current time, t−1 denotes the previous trim cycle, min{a,b} denotes the minimum of a and b, and MaxTrimIncr denotes the maximum allowable trim increment. In addition, NumPagesWithAgeCount[n, 1] denotes the number of pages of the n-th working set that have not been referenced for one trim cycle; NumPagesWithAgeCount[n, 2] denotes the number of pages of the n-th working set that have not been referenced for two trim cycles; and NumPagesWithAgeCount[n, 3] denotes the number of pages of the n-th working set that have not been referenced for three trim cycles. The trim cycle in the exemplary embodiment is one second; however, the invention is not so limited. Based on the equation, one can see that in the exemplary embodiment, the trim-page estimate is the minimum of the previous trim page estimate (plus a maximum trim increment) and the sum of the old, older, and oldest pages in the n-th working set. The maximum trim increment is 30 pages in the exemplary embodiment.

After computing the TrimPageEstimate for the n-th working set, processor 21 executes process block 116. This entails resetting the sample page counter m to one and checking if the n-th working set is the last working set to be considered, as decision block 118 shows. If the n-th working set is not the last working set, processing unit 21 increments the working set counter as indicated in process block 120. In the exemplary embodiment, the method includes sampling pages from every working set; however, one can omit working sets, for example, working sets below some minimum size. Execution of the exemplary method then returns to decision block 104 to begin sampling pages from the next working set.

If the n-th working set is the last working set, as determined in decision block 118, execution continues to decision block 122. In block 122, processing unit 21 determines whether there is a sufficient number of unassigned, or free, memory pages. In the exemplary embodiment, this entails checking the current amount of free memory against a desired amount of free memory. If the current amount of free memory pages is sufficient, execution returns to process block 102, where processing unit 21 repeats the process of sampling the pages of the working sets arid computing new trim-page estimates. If, however, there is insufficient free memory, execution branches to process block 124, which entails trimming one or more of the working sets based on the estimates of trimmable pages.

FIG. 5 shows details of the exemplary trimming process 124. Specifically, a process block 124a shows that the trimming process begins by sorting the working sets based on their respective trim-page estimates. In the exemplary embodiment, processing unit 21 organizes the working sets into six trim-page categories based on descending magnitude of their trim-page estimates. The exemplary embodiment includes the following six categories: more than 400, 201–400, 101–200, 51–100, 25–50 and less than 25. However, another embodiment sorts the working sets based on their trim-page estimates in descending order from the greatest to the least, and another excludes a subset of the working sets from the sorting procedure entirely. The excluded working sets are associated with one or more application programs which are likely to suffer a user-perceivable performance penalty when subjected to trimming. An interactive computer game or other application with a focus on user input and real-time response to user input would be a candidate for exclusion from this sorting. More generally, one could also weight the sorting process so that certain applications would be more or less likely to experience trimming based on their trim-page estimates.

Execution then proceeds to process block 124b. In block 124b, processing unit 21 initializes or sets a working set counter i, which runs from one to N, the number of sorted working sets, to 1 and initializes or sets an age-bin counter j. Thus, trimming has two control loops, one for the sorted working sets and the other for the age bins of each working set. With these control loops, the trimming process generally entails trimming the working sets in descending order of their trim estimates, with specific pages trimmed in descending order from the oldest pages (as indicated by age-bin counts) to younger pages. (In the exemplary embodiment, the youngest pages, that is, those with an age count of zero, are not trimmed; however, other embodiments do trim these pages, but generally only after older pages have been trimmed.)

More specifically, in block 124c, processing unit 21 trims all or a fraction of the pages from the j-th age bin of the i-th working set. The exemplary embodiment attempts to trim a number of pages from the i-th working set equivalent to 50% of the current trim-page estimate for the i-th working set.

After trimming pages from the i-th working set, execution of the exemplary method continues at process block 124d. In decision block 124d, processing unit 21 decides whether there is, as a result of the trimming of the i-th working set, sufficient free memory, specifically comparing the number of free pages to the desired number of free pages. If there is a sufficient number of free pages, execution branches to process block 102 in FIG. 4. However, if there is an insufficient number of free pages, execution branches to decision block 124f. In block 124f, processing unit 21 determines whether the last sorted working set has been trimmed. If the last working set has not been trimmed, execution returns to process block 124c via process block 124g, which increments the working set counter i.

However, if the last working set has been trimmed, decision block 124f branches execution to decision block 124h. In block 124h, processing unit 21 determines whether pages of the last age bin, the youngest pages eligible for trimming, have been trimmed. If they have not been trimmed, execution branches to block 124i. In block 124i, processing unit 21 increments the age-bin counter from the current age bin to the next oldest age bin. Block 124i also entails resetting the working set counter, before returning execution to process block 124c for another round of trimming from the next oldest age bin of the working sets. This process repeats until the trimming process makes sufficient memory available to satisfy the desired amount of free memory. However, if the youngest pages eligible for trimming have been trimmed, execution branches to block 124j. In block 124j, processing unit 121 goes through the sorted list of working gets, trimming pages regardless of age until there is sufficient free memory.

In other embodiments of the invention, the method is restricted to 4 or 5 passes through the working sets during which trim-page estimates are used as the basis for trimming. Moreover, other embodiments trim pages from more than one age-bin at a time, for example, from the second and third age bins, using the trim-page estimate as a basis.

Conclusion

In furtherance of the art, the inventors have presented an operating system which includes unique estimation and trimming modules for respectively estimating numbers of pages eligible for trimming and trimming pages based on the estimated numbers of pages. The exemplary estimation module develops estimates for trimmable by tracking ages of a sample set of pages from each working set, and the exemplary trimming module sorts the working sets based on the estimates of trimmitable pages and trims the working sets based of the magnitude of the estimates. The estimation and trimming modules and methods facilitate faster, more intelligent trimming of working sets, and thus better perfoming computer systems.

The embodiments described above are intended only to illustrate and teach one or more ways of practicing or implementing the present invention, not to restrict its breadth or scope. The actual scope of the invention, which embraces all ways of practicing or implementing the invention, is defined only by the following claims and their equivalents.

What is claimed is:

1. A method of managing memory in a computer system comprising an application program, the method comprising:

assigning a first working set to a first application program, the first working set comprising two first working set memory pages;

determining an elapsed access time for the two first working set memory pages, wherein the elapsed access time is a time that has elapsed since an accessed memory page was last accessed by its corresponding application program;

estimating a number of trim pages for the first working set based on the elapsed access time for the two first working set memory pages, wherein a trim page is a memory page eligible for trimming; and trimming memory pages from the first working set based on the estimated number of trim pages for the first working set.

2. The method of claim 1, wherein estimating the number of trim pages for the first working set is also based upon a previous estimate of trim pages.

3. The method of claim 1, wherein the steps of determining and estimating occur prior to the step of trimming.

4. The method of claim 1, wherein the estimating the number of trim pages for the first working set comprises:

determining a first age quantity of the two first working set memory pages that are in a first age bin, wherein the first age bin comprises memory pages that have not been accessed by the first application program for at least a first amount of time;

determining a second age quantity of the two first working set memory pages that are in a second age bin, wherein the second age bin comprises memory pages that have been accessed by the first application program within the first amount of time but have not been accessed for at least a second amount of time, wherein the first amount of time is greater than the second amount of time; and calculating the estimated number of trim pages for the first working set based on a sum of the first age quantity and the second age quantity.

5. The method of claim 4 further comprising:

determining a third age quantity of the two first working set memory pages that are in a third age bin, wherein the third age bin comprises memory pages that have been accessed by the first application program within the second amount of time but have not been accessed for at least a third amount of time, wherein the second amount of time is greater than the third amount of time; and calculating the estimated number of trim pages for the first working set includes computing a sum of the first age quantity, the second age quantity, and the third age quantity.

6. The method of claim 1, wherein the two first working set memory pages are sampled from the first working set.

7. The method of claim 6, wherein the estimating the number of trim pages for the first working set comprises:

extrapolating, based on the sampled two first working set memory pages, a first age quantity of the two first working set memory pages that are in a first age bin, wherein the first age bin comprises memory pages that have not been accessed by the first application program for at least a first amount of time;

extrapolating, based on the sampled two first working set memory pages, a second age quantity of the two first working set memory pages that are in a second age bin, wherein the second age bin comprises memory pages that have been accessed by the first application program within the first amount of time but have not been accessed for at least a second amount of time, wherein the first amount of time is greater than the second amount of time; and calculating the estimated number of trim pages for the first working set based on a sum of the estimated first age quantity and the estimated second age quantity.

8. The method of claim 1, wherein the computer system comprises two application programs, the method further comprising:

assigning a second working set to a second application program, the second working set comprising two second working set memory pages;

determining an elapsed access time for the two second working set memory pages;

estimating a number of trim pages for the second working set based on the elapsed access time for the two second working set memory pages; and trimming memory pages from the second working set based on the estimated number of trim pages for the second working set.

9. The method of claim 8 wherein the trimming memory pages from the first working set is also based on the estimated number of trim pages for the second working set, and wherein the trimming memory pages from the second working set is also based on the estimated number of trim pages for the first working set.

10. The method of claim 8 wherein trimming comprises:

sorting the estimated number of trim pages for the first working set and the estimated number of trim pages for the second working set based on their magnitudes; and wherein the trimming of memory pages from the first working set and the trimming of memory pages from the second working set is based on the sorting.

11. A method of managing memory in a computer system having one or more application programs, the method comprising:

assigning one or more working sets of memory pages to one or more corresponding application programs;

estimating one or more numbers of memory pages eligible for trimming from the one or more working sets, wherein the estimating one or more numbers of memory pages eligible for trimming from the one or more working sets comprises:

determining how many pages in a subset of memory pages of each working set have not been accessed by its corresponding application for at least a first amount of time;

determining how many pages in the subset of memory pages of each working set have not been accessed by its corresponding application for at least a second amount of time, with the second amount of time greater than the first amount of time;

calculating each number of memory pages based on a sum of how many pages in the subset of memory pages have not been accessed for at least the first amount of time and how many pages in the subset of memory pages have not been accessed for at least the second amount of time; and trimming one or more memory pages from the one or more working sets based on the one or more estimated numbers of memory pages eligible for trimming, wherein trimming comprises: sorting the one or more numbers of trimmable pages based on their magnitudes; and trimming one or more pages from the one or more working sets based on an order of the sorted one or more numbers of trimmable pages.

12. A computer-readable medium having computer executable instructions for managing memory in a computer system comprising an application program, the computer-executable instructions performing steps comprising:

assigning a first working set to a first application program, the first working set comprising two first working set memory pages;

determining an elapsed access time for the two first working set memory pages, wherein the elapsed access time is a time that has elapsed since an accessed memory page was last accessed by its corresponding application program;

estimating a number of trim pages for the first working set based on the elapsed access time for the two first working set memory pages, wherein a trim page is a memory page eligible for trimming; and trimming memory pages from the first working set based on the estimated number of trim pages for the first working set.

13. The computer-readable medium of claim 12, wherein the estimating the number of trim pages for the first working set comprises:

determining a first age quantity of the two first working set memory pages that are in a first age bin, wherein the first age bin comprises memory pages that have not been accessed by the first application program for at least a first amount of time;

determining a second age quantity of the two first working set memory pages that are in a second age bin, wherein the second age bin comprises memory pages that have been accessed by the first application program within the first amount of time but have not been accessed for at least a second amount of time, wherein the first amount of time is greater than the second amount of time; and calculating the estimated number of trim pages for the first working set based on a sum of the first age quantity and the second age quantity.

14. The computer-readable medium of claim 12, wherein estimating the number of trim pages for the first working set is also based upon a previous estimate of trim pages.

15. The computer-readable medium of claim 12 wherein the steps of determining and estimating occur prior to the step of trimming.

16. The computer-readable medium of claim 12, wherein the two first working set memory pages are sampled from the first working set.

17. The computer-readable medium of claim 16, wherein the computer-executable instructions performing the estimating the number of trim pages for the first working set comprise computer-executable instructions for:

extrapolating, based on the sampled two first working set memory pages, a first age quantity of the two first working set memory pages that are in a first age bin, wherein the first age bin comprises memory pages that have not been accessed by the first application program for at least a first amount of time;

extrapolating, based on the sampled two first working set memory pages, a second age quantity of the two first working set memory pages that are in a second age bin, wherein the second age bin comprises memory pages that have been accessed by the first application program within the first amount of time but have not been accessed for at least a second amount of time, wherein the first amount of time is greater than the second amount of time; and calculating the estimated number of trim pages for the first working set based on a sum of the estimated first age quantity and the estimated second age quantity.

18. The computer-readable medium of claim 12, wherein the computer system comprises two application programs, the computer-executable instructions performing steps further comprising:

assigning a second working set to a second application program, the second working set comprising two second working set memory pages;

determining an elapsed access time for the two second working set memory pages;

estimating a number of trim pages for the second working set based on the elapsed access time for the two second working set memory pages; and trimming memory pages from the second working set based on the estimated number of trim pages for the second working set.

19. The method of claim 18 wherein the trimming memory pages from the first working set is also based on the estimated number of trim pages for the second working set, and wherein the trimming memory pages from the second working set is also based on the estimated number of trim pages for the first working set.

20. The computer-readable medium of claim 18 wherein the trimming comprises:

sorting the estimated number of trim pages for the first working set and the estimated number of trim pages for the second working set based on their magnitudes; and wherein the trimming of memory pages from the first working set and the trimming of memory pages from the second working set is based on the sorting.

21. A computer system comprising:

a memory storage for storing a working set corresponding to an application program, the working set comprising two memory pages; and a processing unit for performing steps comprising:

determining an elapsed access time for the two memory pages, wherein the elapsed access time is a time that has elapsed since an accessed memory page was last accessed by the application program;

estimating a number of trim pages for the working set based on the elapsed access time for the two memory pages, wherein a trim page is a memory page eligible for trimming; and trimming memory pages from the working set based on the estimated number of trim pages for the working set.

22. The computer system of claim 21, wherein the two memory pages are sampled from the working set.

23. The computer system of claim 22, wherein the estimating the number of trim pages for the working set by the processing unit comprises:

extrapolating, based on the sampled two first working set memory pages, a first age quantity of the two first working set memory pages that are in a first age bin, wherein the first age bin comprises memory pages that have not been accessed by the first application program for at least a first amount of time;

extrapolating, based on the sampled two first working set memory pages, a second age quantity of the two first working set memory pages that are in a second age bin, wherein the second age bin comprises memory pages that have been accessed by the first application program within the first amount of time but have not been accessed for at least a second amount of time, wherein the first amount of time is greater than the second amount of time; and calculating the estimated number of trim pages for the first working set based on a sum of the estimated first age quantity and the estimated second age quantity.

24. A computer system/comprising:

a memory storage comprising a memory page and an application program; and a processing unit for performing steps comprising:

assigning a working set of memory pages to a corresponding application program;

estimating a trim number of memory pages eligible for trimming from the working set, wherein the estimating the trim number of memory pages comprises:

determining a first access time number of pages from the working set that have not been accessed by the corresponding application program for at least a first amount of time;

determining a second access time number of pages from the working set that have not been accessed by the corresponding application for at least a second amount of time, with the second amount of time greater than the first amount of time;

and calculating the trim number of memory pages based on a sum of the first access time number of pages and the second access time number of pages; and trimming a working set memory page from the working set based on the trim number of memory pages, wherein the trimming comprises: sorting the trim number of memory pages based on their magnitudes; and trimming the working set memory page based on the sorting.

\* \* \* \* \*